US009148458B2

(12) United States Patent
Verkasalo

(10) Patent No.: US 9,148,458 B2
(45) Date of Patent: Sep. 29, 2015

(54) NETWORK SERVER ARRANGEMENT FOR PROCESSING NON-PARAMETRIC, MULTI-DIMENSIONAL, SPATIAL AND TEMPORAL HUMAN BEHAVIOR OR TECHNICAL OBSERVATIONS MEASURED PERVASIVELY, AND RELATED METHOD FOR THE SAME

(75) Inventor: Hannu Verkasalo, Espoo (FI)

(73) Assignee: THE NIELSEN COMPANY (US), LLC, Schaumburg, IL (US)

( * ) Notice: Subject to any disclaimer, the term of this patent is extended or adjusted under 35 U.S.C. 154(b) by 295 days.

(21) Appl. No.: 13/806,820

(22) PCT Filed: Jun. 24, 2010

(86) PCT No.: PCT/FI2010/050548
§ 371 (c)(1),
(2), (4) Date: Dec. 24, 2012

(87) PCT Pub. No.: WO2011/161303
PCT Pub. Date: Dec. 29, 2011

(65) Prior Publication Data
US 2013/0103764 A1    Apr. 25, 2013

(51) Int. Cl.
*G06F 13/00* (2006.01)
*H04L 29/06* (2006.01)
(Continued)

(52) U.S. Cl.
CPC ........ *H04L 65/403* (2013.01); *G06F 17/30241* (2013.01); *G06Q 30/02* (2013.01)

(58) Field of Classification Search
CPC ........ G06Q 10/10; G06Q 30/02; H04L 29/06; H04L 29/08072; H04L 29/06027; H04L 12/581; H04L 65/403; G06F 17/30241
USPC ........................................................ 709/204
See application file for complete search history.

(56) References Cited

U.S. PATENT DOCUMENTS

2009/0187463 A1    7/2009   Dacosta
2009/0262919 A1    10/2009  Schoenberg

FOREIGN PATENT DOCUMENTS

JP           2001056805          2/2001
(Continued)

OTHER PUBLICATIONS

IP Australia, "Examination Report I," issued in connection with corresponding Australian Patent Application No. 2010355789, mailed Jul. 22, 2014 (3 pages).
International Search Report and Written Opinion of PCT/FI2010/050548 dated Dec. 28, 2012.
(Continued)

*Primary Examiner* — Robert B Harrell
(74) *Attorney, Agent, or Firm* — Hanley, Flight & Zimmerman, LLC

(57) ABSTRACT

This invention generally discusses wireless devices, servers and communications networks. In particular the invention pertains to performing observations in one or more mobile terminals and processing and distributing the related data in a server side system through layered data processing activities, and conversion of non-parametric data into parameterized form through the utilization of statistical filtering and semantic data structures. It is further explained how such multi-layer, parametrized data can be utilized for predictive purposes, and how feedback loops can be built with the physical world to improve future predictions. The invention is applicable in various applications, for example in systems where precise digital profiles of users need to be built on a continuous basis, and such profiles need to be dynamically linked to one or several actions triggered by emerging characteristics in the data. The multi-layer approaches makes it possible to structure output statistics into continuous and standardized, periodic datasets, even though input data is highly unorganized, non-chronological, and sporadic. Similarly, the invention describes how the multi-layer data storage structure and chosen statistical operations make it possible to build virtually an infinite number of further aggregations and averages based on the output data streams.

20 Claims, 5 Drawing Sheets

(51) Int. Cl.
*G06F 17/30* (2006.01)
*G06Q 30/02* (2012.01)

(56) References Cited

FOREIGN PATENT DOCUMENTS

| | | |
|---|---|---|
| JP | 2005148289 | 6/2005 |
| JP | 2006012144 | 1/2006 |
| JP | 2007249306 | 9/2007 |
| JP | 2009245019 | 10/2009 |
| JP | 2009251743 | 10/2009 |
| WO | WO 2006040740 | 4/2006 |
| WO | 2009091606 | 7/2009 |
| WO | WO 2010019925 | 2/2010 |

OTHER PUBLICATIONS

Japan Patent Office, "Notice of Reasons for Rejection," issued in connection with corresponding Japanese Patent Application No. P2013-515934, mailed Nov. 4, 2014 (5 pages).

Japan Patent Office, "Notice of Reasons for Rejection," issued in connection with Japanese Patent Application No. 2013-515934, issued Feb. 18, 2014, (13 pages).

Patent Cooperation Treaty, "International Preliminary Report on Patentability," issued in connection with PCT Application No. PCT/FI2010/050548, issued on Dec. 28, 2012, 7 pages.

State Intellectual Property Office of the People'S Republic of China, "Notification of the First Office Action," issued in connection with Chinese Application No. 201080068453.8, issued on Mar. 20, 2015, 5 pages.

NETWORK SERVER ARRANGEMENT FOR PROCESSING NON-PARAMETRIC, MULTI-DIMENSIONAL, SPATIAL AND TEMPORAL HUMAN BEHAVIOR OR TECHNICAL OBSERVATIONS MEASURED PERVASIVELY, AND RELATED METHOD FOR THE SAME

CROSS REFERENCE TO RELATED APPLICATIONS

This application is a U.S. nationalization under 35 U.S.C. §371 of International Application No. PCT/FI2010/050548, filed Jun. 24, 2010. The disclosure set forth in the referenced application is incorporated herein by reference in its entirety.

FIELD OF THE INVENTION

The present invention generally relates to wireless devices and communications networks. In particular, however not exclusively, the invention pertains to processing and distributing data related to observations performed in one or more mobile devices in a server side system through layered data processing activities and conversion of non-parametric data into parameterized form including the utilization of applicable techniques and such as statistical filtering and semantic data structures.

BACKGROUND

More and more data can be collected from mobile devices such as mobile terminals like smartphones, and transactional feeds can be created based on the associated observations. However, these feeds are not self-containing in thoroughly, or even sufficiently, characterizing a mobile device user in question, although the feeds may admittedly tell some details about related, e.g. transaction-oriented, time-dependent (point in time) and contextual (event can be linked to attributes like location or weather) events like the user's movements during a course of daily life.

Second, when behavioral data or technical observations need to be processed, the present database and data processing solutions are non-optimized in the light of multiple factors such as processing speed, memory requirements, or the general availability of historical data and making it available for sophisticated further processing or statistical analysis.

Third, despite the fact there are, in principle, huge amounts of information available about people's life, contemporary systems unfortunately mostly dismiss the linkage between historical data/models and real-time data, i.e. the practical applications, and fail to ascertain that their technical implementation is feasible given widely available database, storage and data processing hardware.

Nevertheless, a number of prior art publication still describe how to collect data points, position the user, or to make contextual data points locally available to other applications of a mobile device. For example, a prior art publication WO2008118119 discloses a mobile device and a method for communicating positioning data of the mobile device to a server at a periodic interval, automatically generating in the mobile device, in response to the server, a present location profile associated with a present geographic location of the device, simultaneously generating, in the mobile device, a set of adjacent profiles provided by the server as being a direction away from the present geographic location of the mobile device, and refreshing in the mobile device, the present location profile and the set of adjacent profiles at the periodic interval.

Notwithstanding the various prior art solutions for storing mobile device-related events and in view of the foregoing there still exists room for improvement and a need to describe how especially multi-dimensional data in particular on human behaviour can be stored and processed through a layered mechanism, not only to optimize performance, or to enable more complex analysis procedures, but also to generate more meaningful semantic indicators and profiles out of the data, and to physically separate different abstraction levels for both technical and legal reasons.

SUMMARY

The objective of the present invention is to alleviate at least one or more of the aforesaid drawbacks of the prior art solutions and preferably satisfy the associated aforementioned needs.

The objective is achieved through the provision of a more intelligent, flexible and adaptive alternative for physically storing and technically analysing data feeds of human behaviour, potentially on a continuously basis and utilizing a layered approach.

A server arrangement in accordance with an embodiment of the present invention may be configured to receive and process observation data in multiple, co-ordinated ways, and the data may be further cultivated into an output that is understandable from the standpoint of the observer and advantageously contains relationships that may even be used for predictive purposes. In various further, supplementary or alternative, embodiments metrics relative to the life of one or more users may be produced preferably with relevant feedback loop(s) to the data processing activities so as to enable calibrating the technical procedures constantly or upon a specific need or instance of a triggering condition. Various embodiments of the present invention enable determining how non-parametric data as collected by wireless devices may be used efficiently in building derived, more abstract (higher-level) data entities such as vectors that describe a user's usage and life habits, or technical factors surrounding the user in connection with the utilization of mobile services, for example. This information may be produced using multiple abstraction layers facilitating virtually any kind of further aggregation procedure and physically saving the required storage capacity and number of actions in processing the data. Some embodiments of the suggested solution may indeed be arranged to convert raw-level data into higher level information that can be used in a variety of applications including mobile advertising or network performance analysis/optimization, for example. Further, a mobile user's physical presence and (past) actions can be linked or compared in real-time with patterns that are stored into databases based on previously received data. Future behavior of the user may be predicted. The solution may be optimized for different, potentially continuous data streams that contain non-parameterized, multi-dimension data, such as sensor data, received from wireless mobile and/or other applicable devices acting as data sources or data intermediaries.

Thereby, in one aspect of the present invention, a network server arrangement comprises a data input entity configured to receive multi-dimensional, non-parametric data, such as sensor data, obtained from a number of mobile devices, such as smartphones, a processing entity configured to parametrize the multi-dimensional, non-parametric data, a memory entity configured to store the parametrized data preferably on a plurality of different abstraction layers as multi-layered data, an aggregation engine configured to target a number of aggregations and/or data modeling activities, such as time-series, averaging and/or sum operations, to the parametrized data in batches, optionally relative to certain time period, location, mobile application or application category, mobile user, and/or a user group, so as to determine from a data batch a number of descriptive higher-level behavioral and/or technical indicators, the functioning thereof being preferably substantially activated at any particular time instant upon at least predetermined, sufficient amount of data or information becoming available or a trigger is released, and a data export entity, such as an API (Application Programming Interface), configured to provide the number of behavioural and/or technical indicators, or information derived therefrom, to an external entity, such as to a mobile marketing entity for selecting personalized ads to one or more mobile users, or to a network analyzing or management entity for assessing network performance and/or user experience and optionally enable it to further optimize the performance and/or the user experience on the basis thereof, respectively.

The procedure of determining behavioural indicators may comprise various innovative items for securing smooth operation.

Namely, in one embodiment, a common ontology may be defined for the stored and processed data, which may be achieved with the data structuring feature of the present invention, which structures received data based on the content and/or dynamic attributes thereof (such as location, user identification, or time) into at least one specific data entity such as a table, preferably adding thereto process categorization information to facilitate easier processing later on.

In another, either supplementary or alternative, embodiment, non-parametric input data, that can be collected from one or several software modules running in wireless devices, may be turned into a richer, more structured, and advantageously parametric data, and preferably at the same time a number of procedures may be conducted for the data that are executable on-the-fly and which thereby reduce the load of potential other modules. This goal may be achieved with an entity configured to process the incoming data streams before handling them over to a memory module.

In a further, either supplementary or alternative, embodiment dynamic, time-stamped vectors that reflect the true behaviour of mobile users in a given number of dimensions may be determined, which may be achieved through utilization of an entity that produces a rich variety of pre-defined statistics e.g. through a number of scripts that process chunks of data in batches and apply advanced statistics techniques, processing activities, and/or other scripted actions, in generating user-level and time-stamped statistics periodically. The vectors are advantageously of a form that facilitates straightforward future conversions, including for example transformation of a given set of day-level behavioural vectors into a weekly vector, through the utilization of a given statistical method, for example arithmetic averaging.

Yet in a further embodiment, the arrangement may be configured to utilize, in a smart way, already calculated behavioural indicators and vectors in producing more complete sets of statistics. For this, a feature called vector aggregations may be applied, which can process, average and extrapolate data from earlier calculated more granular data and generate as an output meaningful statistics with slightly different scope, outputting statistics into different time periods or to groups of users instead of an individual user.

Still, in a further, either supplementary or alternative, embodiment a number of measures may be calculated regarding either dynamic behaviour of a given user (trend analysis) or alternatively differences between any two users of the arrangement, which may be implemented with a feature called correlation of behavioural vectors, which in essence can output measures that communicate the type and reach of key differences between the studied entities (e.g. users or time periods).

In some embodiments, the present invention also strives for understanding significant differences and to generate alarms, or actions, based on those differences. This goal is achieved with a feature called vector triggers, which are a set of predefined configurations which tell in which conditions, after correlating any two particular vectors or calculating new behavioural indicator, a certain alarm should be generated, and passed to either an internal or external module through signalling.

Still according to some embodiments of the present invention the suggested solution may advantageously distinguish between various sources of data related to user behavior. An ontology of incoming data feeds, to make a semantic structure out of e.g. separate tables, may be formed and possibly stored in separate databases. In the background there lies the logic of archiving data into bigger batches, with semantics in place, and multi-level aggregation procedures and/or averaging are preferably applied together with e.g. cluster analysis and/or pattern recognition to the incoming data. Multi-dimensional behavioral vectors may be calculated for each user, which involves also the time dimension for enabling dynamic applications. The vectors can be calculated for a specific period of time, like for a week, and the vector is multi-dimensional in the sense of incorporation of e.g. so-called activity measures (actions per period of time) and/or frequency of usage (on how many of smaller time periods a certain activity happened out of all time periods included in the calculation of the vector) into the same vector. The vectors reflect semantic understanding of user behavior, exemplary vectors described including traveling activity, movement activity, music consumption activity, extent of stress, and sleeping activity.

The behavioral indicators (vectors) may be calculated based on the technical routines and scheduling innovations described herein, taking into account the nature of data obtained from data sources such as smartphones potentially involving, for example, significant number of black periods, i.e. periods with no data available, sporadic synchronization of data, and in many cases incomplete and/or non-standardized data streams possibly in non-parametric form with no predefined structures (i.e. typical sensor data collected by independent client applications). The vectors can be calculated relative to overlapping time periods, the invention proposing an applicable technique to store dynamic vectors without consuming too much storage space. A behavioral vector can be furthermore used to define behavioral classes for each user, based on the relative portion of reference users, in other words the percentile of the current users within a larger group, who obtain lower scores than the user in question in a particular behavioral dimension, for example. The vectors of separate users (Pearson correlation) can also be correlated with each other to derive a metric called similarity index for any pair of users, which furthermore serves as a basis of user segmentation models. Advantageously, the behavioral vectors can be calculated automatically and, dynamically as new information comes available, ascertaining that the outputs of the arrangement are reflecting the most recent available information content in optimized form, at any particular time. With the triggers that are tied to analysis of standardized vectors, significant changes in the behavior can be identified. This disclosure also describes how the suggested solution may be used to increase the intelligence and dynamic performance of mobile advertising.

Preferably the suggested solution may be executed seamlessly, all the time, and through intense and non-standardized data flows at times. For this purpose, some embodiments of the invention includes a feature called "caching", which enables directing incoming data flows through one or more systematic pipelines that ensure that data is processed in the correct order, through a structured processing chain, and that the parametrization processes can be supported in an optimal way. Caching also facilitates advantageous actions, like conversion of non-parametric data into parametric data, and coordinated and well-managed processing where certain actions need to be completed before moving to the next actions and inputted data may need to be organized in specific ways, for example, temporally sorted.

In some embodiments, substantially real-time calculation of meaningful behavioral metrics for mission critical purposes (like mobile advertising or optimization actions based on real-time analytics) may be desired, which may be achieved via a feature called real-time processing, which is tied to the functioning of the cache, and based on pre-defined rules calculates simple indicators like Boolean variables regarding certain behavioral events, or counters to reflect the frequency of certain actions.

To separate different kinds of data from each other, and to structurally divide data points based on the needs related to the utilization of these data points, or based on possible interactions with various aggregation layers so that the calculus load and required time can be optimized, an advantageous feature of various embodiments of the present invention called "layered data mining with behavioral data" may be implemented, which manages data flows through a layered model where raw data may be differentiated from more polished data, where polishing may refer to modifying, filtering, and/or enriching transactional data in particular dimensions to make it more understandable, concise and easier to process during the following steps, and polished transactional data may be differentiated from aggregations and statistics, which are compressing the relevant information into more concrete numbers and indicators and better reflecting individual behavioral and or technical patterns, and facilitating more straight-forward utilization of information by either internal or external systems.

In one further, either supplementary or alternative, embodiment a scalable means to access behavioral data and build customized views or statistics on top of that may be provided. A feature called "middle-layer tables" may be configured to effectively store at least partially aggregated data into a form that is easy to direct to other systems for further aggregations or visualizations.

In one further, either supplementary or alternative, embodiment one of the associated goals may be to avoid taking a fixed standpoint in the light of data processing or aggregations what kind of statistics are needed in the final outputs and/or reports, whereupon a feature of "further aggregations" may be provided to effectively rely on the behavioral indicators arranged into middle layer tables described hereinafter, and generate desired kind of statistics to internal or external purposes.

In one further, either supplementary or alternative, embodiment the goals of ensuring minimum required storage capacity, protecting consumers' rights, and/or facilitating speedy processing of data, a feature called "periodic cleaning" may be provided, which means that the solution may automatically periodically go through the stored raw and derived data tables, and dispose the unneeded data points from the storage all together according to predetermined criteria.

In one further, either supplementary or alternative, embodiment data processing and storage may be flexibly distributed. The suggested solution may include a feature of "managing distributed data mining", which effectively keeps track regarding wherefrom a user is coming, where his or her data points are stored, and if e.g. time stamps affect somehow where the data processing and storage should take place.

Data that is incoming from a wireless device or other data sources, may be first stored in a database that is responsible for caching datasets, and preparing them for batched processes. At this step, data may be also processed, for example sorted, because e.g. XML-processed (eXtensible Mark-up Language) data is not always in a predetermined target form when cached. After caching, the data may be firstly archived into raw-level database (so-called "sensor database") that store all original data, and secondly it may be directed to different analysis procedures, that typically after processing, aggregations and/or averaging store data in an optimized form into so-called "middle-layer" tables.

The aggregations and other processing actions that are needed prior to storing data into middle-layer tables are something that may be triggered based on the amount and nature of data already in the cache storage, for example. Middle-layer tables may contain data in a more concise and reduced form that can be more quickly analyzed and aggregated further in potentially complex ways. These middle-layer tables can be used periodically or in real-time to produce so called "derived tables", which contain readily understandable information and well-defined statistics.

The derived tables may be directly used by external applications, and they are preferably periodically cleared from old data entries. In this kind of data structure, also data that is in a sensor database, is periodically cleared to save only data that is meaningful enough and can be potentially needed in further aggregations at some point in the future. The whole structure is designed scalable, as individual instances of the bigger database system can be implemented locally—for example in different countries. At different levels, in physically separate levels of data model, different levels of privacy (e.g. storing of personal ID information) can be guaranteed.

There may be a centralized system that knows which users' data is stored into which regional or functional database, and therefore the load regarding incoming data can be distributed, as well as the load regarding the analysis of data. Similarly the programming interfaces to fetch data may use the centralized pointers to know where to search for the data. In this proposed system, the database servers advantageously not only distribute among themselves the storing of data, but also processing of data functionality-wise. For example derived databases can reside in a different server than the needed middle-layer data, and servers can coordinate by themselves the data fetching and processing activities. The whole system may be seen as a pipeline of data that follows the logic of e.g. FIFO (First-In-First-Out) queuing, but at the same time applies novel solutions for data processing and partial reducing of storage resolution step-by-step.

In a further, supplementary or alternative, embodiment potentially numerous, e.g. hundreds of, users may be facilitated to query for the calculated data points and statistics by a feature called "virtual access", which makes an abstraction of the user's behavioral indicators and virtualizes the middle-layer tables so that they are easier to access. The "virtual access" feature may connect multiple network servers together, to provide a homogenous user experience for customers who are using the API actively.

According to a further, either supplementary or alternative embodiment, a semantic data model may be built, whereupon the suggested solution could tell about different concepts like sleeping or movements separately, preferably attaching important data points like location and time periods to them periodically and forgetting the raw observation data collected. A "conversion feature" may add semantic information to the data points, and enable more natural language oriented semantic queries.

According to one embodiment of the present invention, filtering and/or exclusion tasks may be performed for the processed data. As large amounts of information can be requested from the provided arrangement by external users, it is preferred that there exists a set of filtering and exclusion tasks that are capable of checking for specific things in the data, and either drop or manipulate data points so that the output is more structured and meaningful.

The suggested solution may generally define a platform that provides a virtual database interface to external wireless devices or network servers to access real-time behavioral and contextual information located in another network server. The platform may not only provide individual data points, but also conduct more intelligent, complex actions with data to reduce the needed processing time or functional processing requirements (complexity) at the querying device, and is capable of providing semantic meaning for the output data through batched data processing.

According to an embodiment, a query language model is proposed for the interface, based on which it can either actively (the requesting device initiates) or passively (when e.g. a change occurs) fetch information and in practice to deliver prepared answers on a timely basis to the querying device. Instead of or in addition to providing for example the latest location, the interface can provide the distance traveled during a predetermined period such as the past 60 minutes, or alternatively the location points from e.g. 60 minutes ago and the current location point (that can be then processed to calculate the needed information at the querying device).

So-called statistical filters may be embedded into the solution so that potentially complex feeds of data can be directed through filters that pre-process most of the data, sometimes converting it from form to another and performing processes that were programmed for it earlier. This makes it easier to provide a profile-based solution for selected analytics, so that depending on the queried data points, and identification of the data source (e.g. a wireless device ID number), different kinds of filters and predefined analysis procedures may be executed and standardized vectors provided in return. The platform is suitable for supporting a variety of different physical data sources a variety of applications that need to be served with analytics data may be supported.

In a further, either supplementary or alternative, embodiment, in view of not only understanding user behavior through metrics and time-stamped transactions, but also of generating higher level descriptors regarding behavioral patterns, a feature called "abstractions" may be provided, which effectively combines multi-dimensional vectors out of available behavioral vectors (e.g. hour-level location dynamics). With this feature, it is possible to generate vectors that can be characterized as behavioral traces, every time with a little bit different parameters, but nevertheless describing a certain behavioral pattern. After this kind of aggregation oriented abstractions of data, as one should notice that the behavioural vectors are already one kind of abstractions though, the user's life is easier to analyze through tools of machine learning and pattern recognition.

In one further embodiment a goal of predicting what people are likely to do next given historical behavior and current context is set. For achieving this goal, a model of user behavior is dynamically built including abstractions of behavior as elements thereof, with, for example, Markov chain kind of dynamics depicted in between elements. As one use case this prediction model may be utilized in dynamically calculating weights and likelihoods of different shifts in the system, and practically at any time providing a vector with likelihoods for possible next states of the system.

In some embodiments learning from the arriving data may be realized. A feature called "feedback loop" may be configured to optionally continuously update the prediction model and calculate a potentially continuous metric depicting how successfully the model's predictions are at any given time. Through certain selected thresholds, the performance of the prediction engine can be addressed in real-time. The feedback loop enables the prediction engine to be truly self-learning In some embodiments, predictions may be given dynamically, for example for the purposes of mobile advertising (context-tied, predictive and targeted advertising). For such a purpose, a state machine (e.g. a Markov model) may continuously give predictions for the next state (e.g. the next location, name of the next person the user calls, the music artist he is going to listen next) based on dynamic queries, and through the calculated performance indicators (how likely the model is to be right) and external or internal modules that provide the pool of specified ads, the system might trigger specific actions like a pop-up of a certain ad if the conditions are prospective enough.

In another aspect, a method for processing observation data to be performed by an electronic arrangement, comprises
  receiving non-parametric multi-dimensional spatial and temporal human behavior and/or technical observation data, such as sensor data, obtained from a number of mobile devices, such as smartphones,
  parametrizing, optionally categorizing and/or structuring, the received data,
  subjecting the parametrized data, in batches, to a number of aggregation and/or data modeling activities in order to determine from a data batch a number of descriptive higher-level behavioural and/or technical indicators, and
  providing the number of behavioural and/or technical indicators, or information derived therefrom, to an external entity, such as to a mobile marketing entity for selecting personalized ads to one or more mobile users, or to a network analyzing or management entity for assessing network performance and/or user experience and optionally enable it to further optimize the performance and/or the user experience on the basis thereof, respectively.

The various considerations presented herein concerning the embodiments of the arrangement may be flexibly applied to the embodiments of the method mutatis mutandis and vice versa, as being appreciated by a skilled person.

Further, regarding the utility of the present invention, the invention is applicable in various use scenarios, for example in conjunction with systems where precise digital profiles of users need to be built on e.g. continuous basis and the profiles need to be dynamically linked to one or several actions triggered by emerging characteristics in the data. A number of semantic indicators and profiles may be determined on the basis of the observation data feed with potentially logically and physically separate abstraction levels. Metrics about users' life or surrounding technical context may be built in a real-time fashion. Behavioural handling of e.g. smartphone-based observations and related technical procedures is thus arranged. Accordingly, feed content relative to mobile observations may be provided as input and relevant behavioral vectors generated through a combination of e.g. a state machine approach and data clustering approaches as an output.

The suggested solution facilitates e.g. batched processing of chunks of data, and eventual removal of historical data which is preferable for sparing the storage capacity. On the other hand, new incoming data is ready for analysis quickly and even historical data is available for analysis if desired. A novel technical database solution is therefore provided to support analysis processes and time-series analysis, being capable of dividing data into distinct layers based on the requirements of handling thereof. Also, due to technical and legal reasons, data storage may be distributed physically across different servers or other entities.

Sensor data may be differentiated from more polished data physically and sustainable automation can be built for producing continuously refreshed insights about the mobile device user's life. A high number of applications may need to use behavioral and contextual data about human behavior. In order to perform meaningful operations with the data, the suggested solution is configured to facilitate multiple kinds of data requests, to reduce the bandwidth demands, to comply with real-time requirements, to support more intelligent queries that need dynamic data processing at the serving end of the system, and to support triggered actions and partial automation of data distribution. Physically separate systems can exchange behavioral information and divide responsibilities in data handling specifically in the case of sensor data collected from wireless devices and being further processed by one or several network servers, the data containing multiple types of different data points and aggregate vectors.

Finally, reverting to the availability and usability of historical data, accumulation of databases of behavioral and contextual data enables building understanding of people's likely actions, in other words to build predictive features into commercially available solutions like social networks.

As a practical example of the applicability of the present invention, an external web application may be considered, automatically reflecting significant events happening in a selected user's life (for example by sending an email report to one's friend when he/she has visited at least 3 countries during any given 7 days).

One other application may be configured to send automated and targeted advertising to the user of a mobile device based on learning from the user's recent behavior (for example sending Metallica record discount coupons to one when he/she is nearby a record store, which has an active Metallica discount, and the likelihood for the one to listen to Metallica during the next 10 days is determined as higher than 2%).

As one more example, the present invention may be applied to dictate how different kinds of data should be first of all stored into databases so that they can be cleverly accessed by application programming interfaces located in different layers of abstraction. As a practical embodiment storing of location information, that can take multiple forms including cellular tower IDs, WiFi hotspot IDs, and GPS fixes, is explained hereinafter, and the way of abstracting the actual way of storing data points is also disclosed. Based on the descriptions, key processes are further explained regarding the recognition of context-sensitive and repetitive patterns in user behavior, and calculation of statistics that reflect the uniqueness and significance of identified patterns.

Yet, as a practical embodiment it is described hereinlater how the obtained data may be processed in multiple batches, and how the physically separate sources of information (for example the geo-coordinates of cellular towers and precise transaction logs of cellular towers) may be used in parallel in the processing and modeling processes. Output logs of the user's life patterns, including behavioral indicators and relevant aggregated data streams and behavioral or predictive models may be dynamically linked to new incoming data, and certain filters and/or triggers may be programmed to execute selected actions when one or more predetermined conditions are fulfilled, and the prediction engine may calculate the likelihood of something happening The associated signaling procedures are further reviewed in this document. The proposed solution is able to match separately defined estimation models and e.g. derived Markov scenarios to real-time data feeds, making effectively real-time guesses about the user's next move. A physical mechanism may be provided to indicate to the prediction engine if the predictions were successful or not.

The expression "behavioural indicator" refers herein to e.g. numerical or categorical value, in the case of one dimension specific indicator, or multiple values, in the case of multi-dimensional behavioural indicator like the average distance moved during a certain day and the average direction of such a movement, or as another example, a behavioural vector describing e.g. a user's frequency of voice calling and average time spent with voice calling per unit of time, which communicate a user's behavioural activity, potentially including a possible scale and semantic categorization and/or labelling for reflected frequency, activity, type and/or other kinds of metrics of the action.

"On-the-fly" refers to substantially real-time processing.

"Technical" is used here with reference to data, aggregations, indicators and statistics that relate to observed technical context or event, instead of behavioural context or event, meaning for example parameters measured from the cellular network, including signal strengths and type of network being accessed.

"Non-parametric" refers to data points that do not directly to link to other data points, in other words the data is in silos, each data entity being from one specific group, without a defined relation to any other data point being explicit.

"Parametric" refers to data points that link to each other, for example a network base station observation includes at the same time also a measurement for the current throughput and signal strength.

An "internal module" refers to a logical module inside the physical system or device arrangement, or other entity that the present invention is depicting.

An "external module" is correspondingly a module that sits outside of the physical reflection of the realization of the present invention disclosed herein.

An "API" refers to an application programming interface, substantially referring to a preferably programmable framework of pulling or pushing data from/to the arrangement in a coordinated way.

"Analytics" refers herein to a conduct of decision-making based on factual and/or quantitative information.

"Observers" refer herein to processes capable of generating data items, based on e.g. queries and use of the wireless device's operating system capabilities. Observers are functionally and sometimes also physically sensors, potentially but not always residing in a wireless device and running continuously, which may automatically sense, for example, changes identified in a cellular base station usage (when the device jumps from the coverage of one tower to the next, for instance). Observers may also refer to channels of user-generated content (for example, blog entries or written text messages).

"Triggers" refer to rules and processes that trigger (induce) a certain action. In particular, they may define how the observations can be more effectively and automatically be done in wireless devices. Triggers can be based on time intervals, contextual changes and observations, external requests, or internal requests e.g. in a situation in which more data is needed for some other data points.

The concept of "intelligence" is used in this document in referring to a set of rules, algorithms, databases and/or processes that coordinate the overall procedure or individual micro-processes (for example, the triggering logic) of the associated entity. Intelligence is something that makes the related system to work smarter, in a more optimal way, saving energy and improving accuracy, for example. It may be based on fixed and/or self-learning, adaptive algorithms as well as on external input.

A "server" generally refers herein to a node or at least a logical aggregate of several nodes present in and accessible via one or more networks, for example the Internet. The server may serve clients, e.g. mobile agents running in wireless devices and other entities such as various network services. Clients may thus communicate with one or more centralized servers. Client-server architecture is a commonly used topology of building systems in the Internet.

The concept of "processing" is used in this document to refer to various kinds of actions that may be performed for data either in a static or more dynamic, on-the-fly manner. These include data conversions, transformations, formulations, combinations, mash-ups enrichment, correlations, clustering, factoring, normalizing, and/or filtering, among others. Some forms of processing may be actively used in various embodiments of the present invention, including combinations and mash-ups (linking data points together and building relational data structures, for instance), conversions (generating, for example, meaningful streams of information entities from raw-level, unsorted data items, such as observed location points), enrichment (for instance, adding metadata and making the data richer than originally) and/or filtering (leaving out data that is not relevant or needed anymore, for example).

A "smartphone" is defined in this document as a wireless device capable of running an operating system facilitating installation of add-on applications and enabling a packet data connection to a target network such as the Internet.

An "arrangement" refers herein to an entity such as an apparatus, like a server apparatus, or a system of a number of, at least functionally interconnected apparatuses.

The expression "a plurality of" refers herein to any integer starting from two (2), e.g. two, three, or four.

The expression "a number of" refers herein to any integer starting from one (1), e.g. one, two, or three.

The expressions "entity" and "module" are used herein interchangeably.

BRIEF DESCRIPTION OF THE DRAWINGS

In the following, the invention is described in more detail by reference to the attached drawings, wherein.

DETAILED DESCRIPTION

Figure 1:
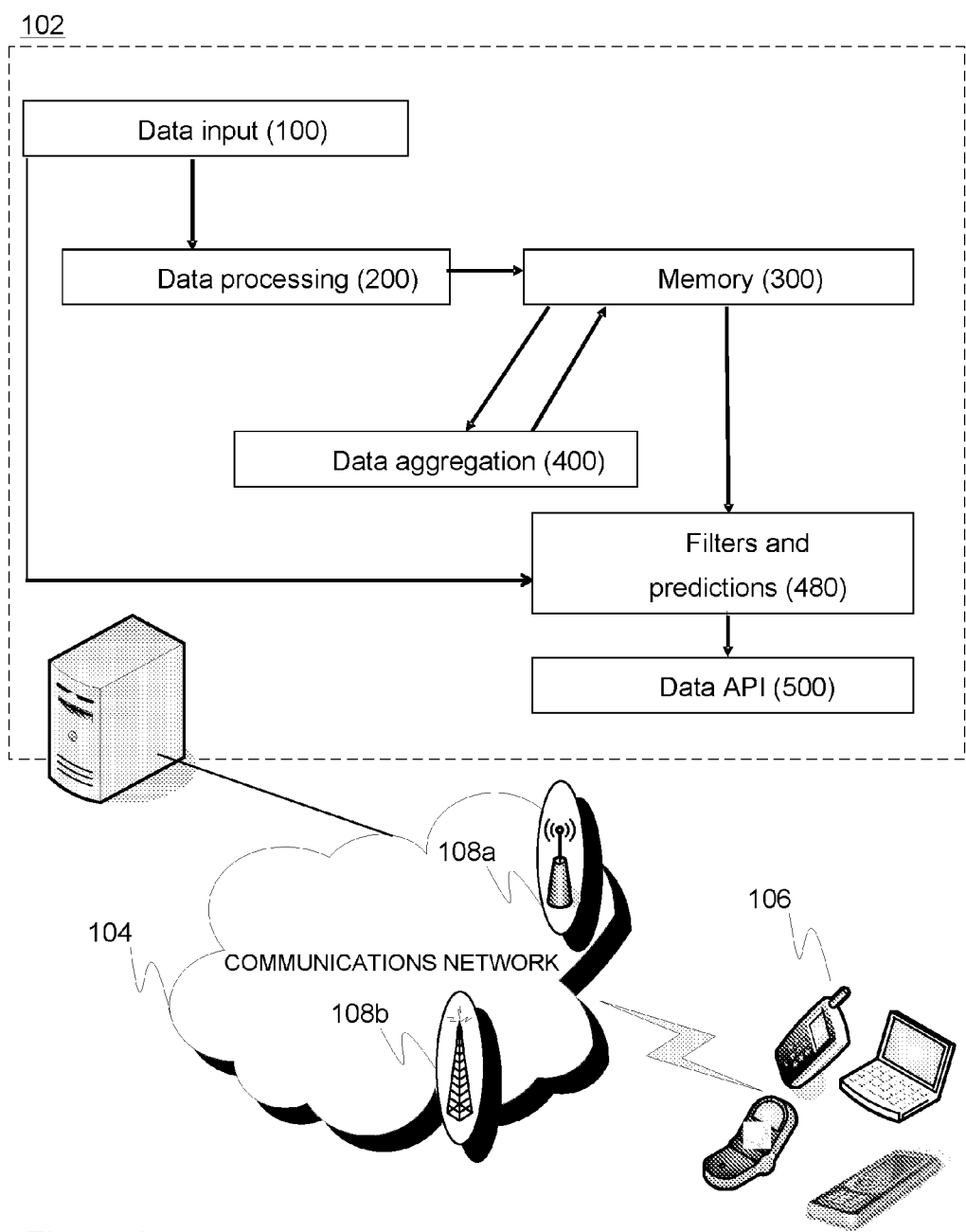
FIG. 1 illustrates the general concept and main modules, i.e. overall architecture and design principles, of an embodiment of the server arrangement in accordance with the present invention from a functional standpoint.

In the light of the foregoing and in particular with reference to FIG. 1, the general concept of the present invention is described via an embodiment of the (network) server arrangement 102 wherein the arrangement 102 comprises a data input entity 100, such as log reader, for inputting and caching data provided by a number of preferably wireless mobile devices 106 optionally via at least one communications network 104 such as a mobile network, or other access network, and/or the Internet, for example, a processing entity for processing data 200, a multi-layered memory entity for storing data 300, a centralized logic module that coordinates various levels of data analysis, aggregation and advantageously hosting of the units for querying and analyzing the data based on triggers 400, and one or more output entities/modules for organizing the results of the analysis 480 and 500.

The input entity 100 may be thus configured to execute a predetermined, potentially reconfigurable, logic to physically structure data into different data tables and processing entities in a correct order, for instance.

The processing entity 200 may be configured to secure scalable receiving and caching of incoming data into batches and comprise or be at least functionally connected to e.g. a filtering module capable of modifying and processing the data incoming data to standardize the data streams going to the internal or connected analysis modules.

The centralized logic entity 400 being also called as an aggregation entity/module, may be further capable of processing e.g. batches of data and preferably determining a predefined number of indicators describing the batches. It may contain or be at least functionally connected to a prediction entity/module 480 capable of preferably continuously finding vectors of patterns and so-called vector identifiers and matching this/these with incoming real-time information and triggering predictions dynamically, and/or contain or be at least functionally connected to a feedback entity/module providing information back to the prediction module to reflect if the predictions were right or not, the prediction and feedback modules being described in more detail hereinafter.

Yet, the arrangement may include a database (management) entity 300 capable of storing data using various layers of abstraction, and distributing physically the storing of data if required, either based on the level of aggregation, or alternatively based on other criteria like the segment of the user, to be described in more detail hereinafter.

Accordingly, various embodiments of the present invention e.g. from the standpoint of the related arrangement may be generally applied to define a common ontology for basically all the stored and processed data, which may be achieved with an embodiment of the data structuring feature of the present invention being configured to structure potentially all incoming data based on their content and dynamic attributes (like location, user identification, or time) into at least one specific table, preferably adding during the procedure categorization information to facilitate easier processing later on. Typical category assortment may include at least one category selected from the group consisting of:
1. Application usage data (clickstreams),
2. Mobile web browsing usage data (clickstreams),
3. Network performance data,
4. Device feature usage data,
5. Device system data (e.g. battery status)
6. WiFi network performance data,
7. Memory system data,
8. Alarm clock data,
9. Calendar data,
10. Phone book content
11. Message logs, and
12. Voice call logs.

One or more entities of the present invention, such as the processing entity 200 and/or entities included therein or connected thereto, may advantageously turn non-parametric input data, that can be collected using one or several software modules, e.g. agents, running in wireless mobile devices, into a richer, more structured, and/or parametric data on the network side, and at the same time conduct procedures for the data that are doable on-the-fly, thereby reducing the load of other modules of the arrangement or external thereto. An entity of the arrangement, e.g. processing entity 200, may be assigned a responsibility to process incoming data streams before handing them over to a memory module.

For example, any one or more of the following actions may be done in connection with parametrization:
1. Adding application categorization(s) (app category and app class) to application name(s), through first mapping any specific application name into a harmonized application ID (e.g. all the different localizations of the default web browser will be translated into a unique application ID), and then mapping category names, app type, and class names, into the same row,
2. Adding information (site/page category etc.) on web domain, and
3. Adding location tag to an observation.

In the parametrization process, either systematic relations between different tables through location or time proximity, or alternatively heuristic procedures including the identification of other common demonitors, including for example technical data like network base station cell-IDs or WiFi hotspot indices may be advantageously used in combining from separate and non-parametric observations much richer parametric data, including also parameters potentially acquired outside of the system, including for example weather data, geographic place names, network status information, among others.

Meaningful vectors may be calculated continuously so that they reflect the true behaviour of mobile users, and a module, such as centralized logic/aggregation entity 400 and/or entities included therein or connected thereto, may be configured to produce a rich variety of pre-defined statistics e.g. through scripts that process chunks of data in batches and apply advanced statistics techniques, processing activities, or other scripted actions, in generating user-level and time-stamped statistics periodically.

For example, any one or more of the following kinds of behavioural indicators may be calculated based on the data that is collected from mobile devices:
1. Average browsing face time in predetermined units such as minutes per predetermined period such as a day per usage,
2. Average sleeping time during a predetermined period such as December 2009 for a certain user in hours,
3. Average span of daily movements in predetermined units such as km or miles per day per user,
4. Average entropy of location dynamics for a certain user for a certain date.

The feasible metrics depend on the applications and needs, but typically the metrics are in the form of minutes, sessions, transactions, or other events per unit of time, frequency metrics on the other hand communicating about the relative occurrence of events during a defined time period, and likelihood measures communicating about the relative propensity for certain things to happen either conditionally to something else or unconditionally, in which case the likelihoods may be more static figures in given set of conditions and context, such as a period of time. Key metrics are typically meaningful per se, and they facilitate all kinds of derives metrics, including for example Boolean variables for usage if a certain usage activity threshold is exceeded.

In order to utilize already-calculated behavioural indicators and/or vectors in producing more complete sets of statistics, an embodiment of the arrangement may comprise the aforementioned feature called vector aggregations, which can process, average and/or extrapolate previously calculated more granular data, and generate as an output, meaningful statistics with slightly different scope, determining statistics e.g. relative to different time periods or groups of users instead of an individual user, for instance.

Regarding the point above, an embodiment of the arrangement in accordance with the present invention may be configured to calculate e.g. daily statistics, and derive, for example, at least any one of the following similar statistics on the basis of the daily statistics:
Weekly statistics (usage activity, frequency, user penetration),
Monthly statistics, and
Annual statistics.

In order to calculate measures regarding either dynamic behaviour of a given user (trend analysis) or alternatively differences between any two users of the system, correlation of behavioural vectors may be determined, which may lead to output measures that communicate e.g. the type and/or reach of the key differences between the studied entities as mentioned hereinbefore. The differences may be pinpointed through a deduction of normalized vectors from each other. Correlations may be found, for example, through multi-dimensional Pearson correlation coefficients.

To understand differences in user behaviour and/or to generate alarms, or actions, based on the differences, vector trigger(s) may be utilized. The vector triggers are a set of pre-defined configurations which describe the conditions in which, after correlating any two particular vectors or calculating new behavioural indicator, a certain alarm should be generated and optionally passed to either an internal or external module through signalling. In practice, this kind of a trigger could be, for example, a trigger reflecting that a user has woken up, is in movement, or is about to get some sleep, for example.

Figure 2:
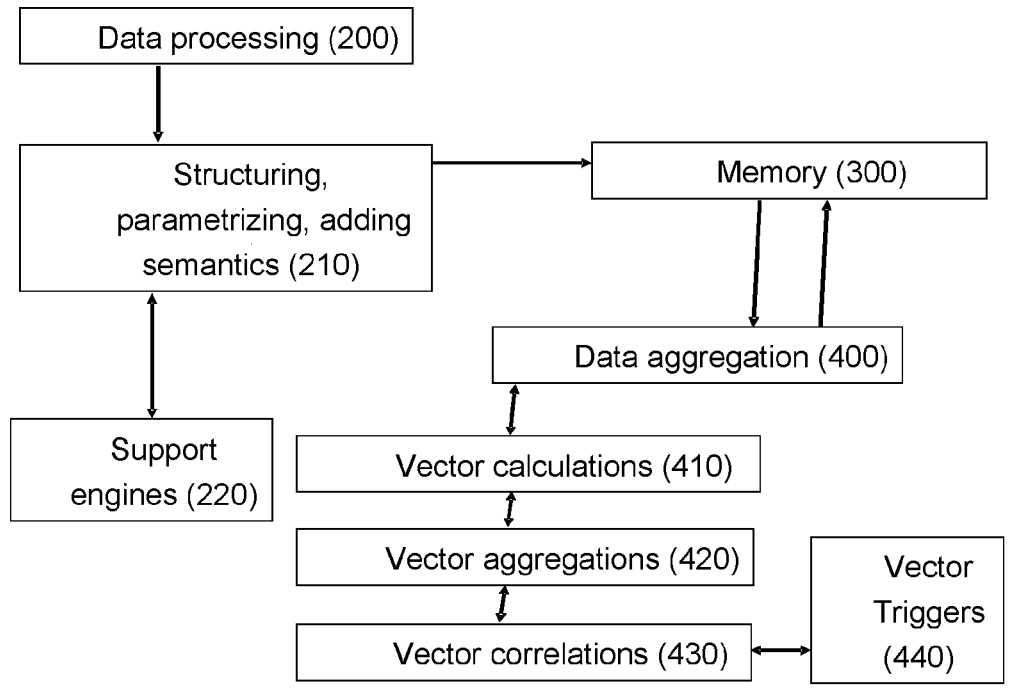
FIG. 2 illustrates different features of an embodiment of the arrangement with focus especially on the calculus of behavioural indicators such as vectors.

Indeed, with reference to FIG. 2 especially disclosing an embodiment of the features particularly related to the calculus of behavioural indicators, the data processing entity 200 may be made responsible for first-hand data pre-processing activities and on-the-fly conversions, whereas the next entity either included in the processing entity 200 or at least functionally connected thereto, an entity for structuring, parametrizing, and/or adding semantics 210, may be responsible for dividing data into a number of structured entities such as tables based on their content and attributes, being preferably capable of utilizing either internal or external support engine 220—which may include modules like location provisioning or weather API—in adding e.g. remotely received and/or locally generated parameters to the data, including also optional procedures where one or several data points from different data tables may be mixed with other data points to either enrich original data points or to form completely new kinds of data points as a result.

The memory module 300 may be responsible for managing the multi-layer data storage and other relevant functions, whereas the (centralized) logic for data aggregations 400 implements an advantageous feature by being able to go through e.g. pre-programmed or scripted activities in analyzing the data in batches e.g. at discreet intervals. In data aggregations, one or more data points from one or several data entities such as tables may be processed in a batch, where e.g. time-series, averaging and/or sum operations can be used in squeezing meaningful statistics out of the transactional (time-stamped) data.

The data aggregations module 400 may comprise or be at least functionally connected to a number of distinct modules as mentioned hereinbefore, including vector calculations 410—calculus of statistics and behavioural indicators and outputting of predefined vectors comprising all such outputs, vector aggregations 420—averaging and aggregating calculated vectors for e.g. a set of users or for a period of time, and vector correlations 430—comparison of any two vectors against each other either automatically or by request.

Finally, the afore-explained vector triggers 440 may define a number of actions that need to be taken if predetermined correlations output certain specific results.

Reverting to the support engines block 220, an example is provided hereinafter of a module that is capable of enriching (raw) data as a part of the pre-processing actions targeted to the received data.

A location handler module may input raw data, including location-related information in a variety of forms, and return location data in a more standardized way and/or format back to any requesting module. In the location handler module, locations may be recorded e.g. with latitude and longitude geo-coordinates (degrees with 4 decimals, for instance) in specific location variables. A so-called master location entity, such as a table, may be provided, where each individual location update is to be stored. In addition, there may be an entity such as a table where locations will be aggregated for each user for a given time period, for example for a 5-minute period, to facilitate easy aggregations and mappings to other tables and preferably to exclude outliers through basic statistical methods.

Regarding location, the location handler module may input, for example, each change of the active base station of the cellular network (and additionally input data covering the scans of visible base stations at a given frequency), periodic or non-periodic data on the scans of WiFi hotspots at a given frequency, periodic or non-periodic data on GPS fixes at a given frequency, and/or data from a mobile device's location application programming interfaces.

The location handler advantageously systematically processes each separate piece of location information it receives. For incoming new, currently unknown base stations or WiFi hotspot indices, the coordinates can be retrieved from internal or external other location handlers which are able to map base stations or hotspot indices to geo-coordinates. In addition, the location handler may maintain its own databases to map base station indices and WiFi hotspot indices to geo-coordinates. The location handler may process practically all incoming data to add tangible location coordinates for each incoming location-related observation like radio network level parameters.

If a GPS or precise location coordinate through the API of the mobile device is received, the location information for the currently active base station and WiFi hotspot active at that time will be updated in the location handler's internal database.

In addition to raw data, these possible location stamps may be collected into a special location table, indicating the user in question, time, and location point and accuracy. In a modest case, the location may be updated in the table at each base station scan or change, for instance. For the table, location names may be added at the same time when creating new entries, including for example building/place name, address, area, city, postal address, and/or country. Location names may be retrieved from external or internal modules that can return place names in response to geo-coordinates, for instance.

For base station and WiFi-based location lookups there may be also other tables that store the respective coordinates' location names, so that no additional location name lookups needed for them. For example, there may exist a separate indexed table, where each base station index is mapped to relevant place names. For GPS-based and wireless device API-based location lookups the location names may be retrieved in real-time from internal/external modules.

The location table may be further aggregated into a form where the location is stored for given time periods, for example 5 minute periods, by using a median or similar function for each time period over all location observations.

As part of the overall data processing, various embodiments of the present invention may apply in selected cases so-called queuing, wherein data points are processed through two more steps in order to facilitate smart mapping or matching of information between any two tables.

As disclosed hereinearlier, various embodiments of the present invention may further include converting and/or processing non-parametric data, which is typically easier to collect from various sources in a standardized way, to parametric observations and richer information stored into the final tables from which more complex aggregations can be done.

As an example relating especially to location aggregation and parametrization processes, the procedure of matching location data into observations may be carried out as follows:

1. Several different observation types are received in a bigger chunk, covering a predetermined time period, for example several, e.g. 3, days of human (user) behavior.

2. After first-level polishing, the data stream is directed into a 3-step process.

a. In the first step, preferably substantially all data in a given chunk is sorted chronologically, as it cannot be always assumed that the inputted data is in order b. In the second step, the data in the chunk is processed row by row, and only data points related to locations, like GPS fixes, base station changes, base station scans, and WiFi scans, are processed, and a separate location handler module is used to map all this information into geo-coordinates. As a result, the output of the location handler module, including standardized location stamps instead of individual technical observations, is stored into a new table where all location updates are stored. In addition, a more standardized location table is created, where the average location information is updated for a defined time period, for example for every 5 minute period. Statistical methods, like median, may be used for deriving a sufficiently good approximation of the location for that period. In addition, even though there are no location updates relative to a given period, the process can generate a location stamp for that missing period conditional on the fact, for example, that it is can be heuristically determined from the data that the location most likely has not changed during the past 5 minutes or other predetermined period.

c. As the third step, all other data is directed through in a chronological order, and the previously processed location data may be easily mapped to various observations, and therefore parametric data can be generated as an output.

As a certain preferred entity of the invention, layered data mining to be described in more detail hereinafter is capable of initiating a process where data is aggregated and statistical procedure(s) are applied to convert it into an output form which is more understandable to external systems than the original transaction-level observation data.

Accordingly, as a related example, it is here explained how the behavioral vectors may be calculated 410, aggregated 420 and correlated 430 regarding human behavior in terms of smartphone usage.

As an input, this exemplary embodiment of the present invention receives a batch of data, e.g. log rows, on smartphone application usage. In the raw, observed data, each row may describe an activation of a smartphone application in the user interface of the wireless device, for instance. Each row may have been already pre-processed earlier meaning that a so-called mapping ID may have been attached to the raw-level original technical names of the application, the idea of which is to give a unique identifier for each application entity, regardless of the logged raw-level name that can, for example, depend on the language of the user interface of the wireless device. The mapping ID may be additionally enriched with further data/table(s), which maps each unique application identifier into a set of other variables like application type, application category, application sub-category, etc.

Based on the mapping process, all application rows that do not represent real applications, for example different kinds of menus, screensavers, and/or homescreen applications, may be removed from the data. As part of the process, also outliers are preferably excluded, including e.g. exceptionally long application sessions. On the other hand, the polished data stream should be cleared of duplicate cases, where after polishing there could be two rows with exactly similar names but different time stamps, this coming as a result of, for example, the fact that there was an incidental jump to e.g. a home screen application during an application session, from where people immediately returned to the original (real) application. After exclusion of applications that do not represent real usage, there might be two rows in sequence with the same application being present, and therefore these rows should be combined together as they represent the same usage session. The pre-processed data stream on application usage can, for example, therefore include a set of rows with unique user ID, time stamp, and/or some kind of application identifier, but can include additional information like application categories and so on.

In calculating behavioral vectors out of this kind of specialized and well-prepared data, the vector calculus engine(s) 410, 420, 430 is able to get a chunk of these rows from the data aggregation entity 400.

The entity in charge of the procedure may work so that it obtains, as a parameter, starting time and ending time, and a set of user IDs that it is supposed to be processing. After receiving the raw level data, the entity may exclude data that does not fit the parameters of its batch run. Secondly, the behavioral indicators may have two key dimensions, the first being the reflection and/or abstraction that it is supposed to be describing, and the second being the time scale the activity of which, for example, it is supposed to be reflecting. The time scale may be, for example a day or a week, meaning that the indicator in question will be calculated so that it describes average activity during one day or week, respectively, during the observed time period.

An aggregation related task that the entity could then execute might include calculating how many distinct days or weeks, respectively, there was some usage observed for a particular application or device feature, for example. This sets the baseline for calculation of frequency related statistics, given that the potential time units for usage can be derived, in other words how many days there was some data available and the device was physically turned on, so that it is easier to calculate statistics that reflect the average behavior per potential day of usage or other activities. As an example, it may be that there is a chunk of data received corresponding to a period of one year, meaning that the first observed date is the first date of the year, and the last observed date is the last date of the year.

However, during 4 months in the middle, no data was received, potentially because the data collection feature was disabled. First, a simple aggregation procedure may be executed to determine how many distinct months there was potential usage, which in this case will lead into a result of 8 months, which then serves as the baseline.

After having aggregated the baseline potential time of usage or activity, the process may proceed deeper into calculations. In this particular example, the objective was targeted towards acquisition of tangible reflections on the extent of application usage. The raw level application data stream does not obviously tell much about this. Thus, there might be multiple kinds of different vectors that better describe the usage of applications, and one key design goal may be that these vectors are calculated using minimum number of rounds or batch runs. In this particular example, two such vectors are more thoroughly explained, said vectors being potentially calculated during the same batch run.

The first vector may indicate application face time, which tells about the time people spend in front of a certain application with their mobile phone. The second one may reflect application usage frequency, which tells about the relative occurrence of usage. For the purposes of this particular example, it is assumed that the sole interest is in day-level statistics for application usage activity and month-level statistics for application usage frequency, but the data itself can cover some other period such as full year, for example. For these variables, the process first aggregates an output file, where for each user, for each calendar day, the sum of cumulative face time spent during that day with each application is calculated. As a result, an aggregated data table will be constructed containing information on each user's each day's applications that were used, and about the fact whether it was used, meaning basically if the row exists as no row exist for an application if no usage was observed, and about the activity of usage meaning how much usage there was in terms of spent face time or number of sessions for example, this information activity being stored as variables for each row. This kind of aggregation table therefore reflects across all the applications about both the existence or inexistence of usage, and the activity of usage. This kind of table it is also easy to aggregate further.

Next, this information may be further aggregated, so that ultimately an aggregation file is constructed wherein for each user, for the full calendar year, for each application, there is information regarding the total time spent with the application during that period, and total number of distinct days during which the application was used. For this table, there is a merge operation conducted, which means that information calculated in the beginning, regarding the potential number of usage or activity days for that year, is brought in. After that operation, it can be calculated with a simple division operation that on average how many minutes any particular user spent with a particular application per potential day of usage. With another division operation, dividing the distinct number of observed usage days for a particular application by the total number of potential usage days, we end up with a frequency vector that at maximum can have value 100%, and at minimum 0%, and it tells about the relative occurrence likelihood of that application, reflecting how repetitive the user's usage is.

As an output, these kind of behavioral vectors may be combined together through different averaging procedures or by simply summing up the vectors, so that for a certain period, like one day, week, month or year, the combined vector tells about the usage activity with one or multiple metrics, meaning the number of metrics or behavioral indicators per studied application or other activity, together form a multi-dimensional, meaning the number of different applications or activities. In this kind of combination, averaging or summing process, more detailed, for example daily level vectors, are typically processed to come up with a week level average of observed behaviour. It is important to acknowledge that in some cases there is a loss of information in behavioural calculus. For example when calculating a behavioural indicator for a particular week's average time spent with the web browser, from this metric it is not possible to derive a frequency measure for the month-level figure of frequency of web browser usage, as the input data for that kind of calculus requires the data to be on the level of days, and at the same knowledge about the potential usage, meaning distinct number of usage days for that particular month, needs to be known.

The same procedure can be repeated with different kinds of aggregation levels. For example, instead of application entities, the base entity of the aggregation could be an application category, application sub-category, or something else, like from mobile web browsing logs it could the domain the user has visited, or from device feature logs, it can be any particular device feature of interest.

When behavioral vectors, for example on application usage, are calculated, the resulting vectors may be run through a standard regression analysis, with, for example, timestamp being the key independent variable, and with this kind of advanced correlation approach possible time trends can be studied, and e.g. average slope for the trend determined.

As another example, a standard Pearson correlation coefficient, or anything similar, can be calculated against e.g. year-level behavioral vectors of any two users, and the behavioral similarity index can be therefore determined.

As a further example, it is here explained how behavioral vectors may be calculated 410, aggregated 420 and correlated 430 regarding modeling of human location dynamics, in other words movements.

A chunk of location data may be first obtained, identifying typically all possible location updates that could have been derived during pre-processing, which may combine data from several sources, including WiFi hotspot scans and base station scans, or GPS fixes, and this location information in a form of e.g. a table typically forms a non-standardized stream of data. The aggregation entity may first turn this location stream into a bit more standardized form, for example it may calculate a table row for each, e.g. 5-minute, period, where the approximate location is calculated from the transaction level data, which may be performed through statistical modeling, by, for example, utilizing a median function to end up with the best approximation. This typically also solves the problem of outliers. There can be heuristics attached to this process so that, for example, if there are missing data for a certain 5-minute time period, perhaps because no location updates have been done, but with other data tables it is obvious to see that the device was on, a location point may be created for that 5-minute period based on the previous 5-minute period's location point, to end up with more standardized stream of locations.

Next, a behavioral indicator may be derived regarding the user's daily movements, for instance. To do this, simple clustering may be initiated during which all geo-coordinates that are in close proximity according to the used criterion may be grouped into one significant location spot, for example. By applying standard network analysis and clustering approaches, this can be done effectively, and therefore for each 5-minute period, for example, an index describing a distinct location may be established. After this, if the final interest is to end up with daily level behavioral vectors regarding the user's movements, an aggregation procedure will follow; for each user, for each day, e.g. 5% and 95% percentile of latitude coordinates and respectively 5% and 95% percentile of longitude coordinates may be calculated, followed by a distinct number of place indices for that particular day.

With the percentiles, outliers may be excluded and/or e.g. a 4-point square be formed to approximate the area where the user has mostly been moving during a day. By now calculating the geographic distance of the two furthest points, meaning the length of the diagonal, a measure called the sphere of movements, reflecting on average the area where the user moved during that day, may be established. In addition, a behavioral indicator called place entropy may be calculated, which simply reflects that in how many distinct places, where in this case the user spent at least 5 minutes, the user had visited during a particular day. As a result, a two-dimensional vector may be formed for each day per each user regarding his/her location patterns. The dimensions thereof reflect the extent and variety of location dynamics.

These merely exemplary location indicators may be then aggregated further. For example, it is possible to form month-level averages from those vectors, or an aggregate location behavior indicator for a group of people, for example. Also, through correlations, it can be studied whether, for example a day of the week is affecting the extent or variety of location dynamics. For this, standard analysis of variance tools can be used.

Various embodiments of the present invention are advantageously enabled to separate different kinds of data from each other, and to structurally divide data points based on the needs related to the utilization of these data points, or based on possible interactions with various aggregation layers so that the calculus load and required time can be optimized. These objectives may be achieved with the aforementioned feature generally called "layered data mining with behavioral data", by which it is referred to managing data flows through a layered model where raw data is differentiated from more polished data, and polished transactional data is differentiated from aggregations and statistics. All together, there may be at least the following kinds of layers regarding data processing and storage:

1. Raw-level data (e.g. transactional observation data received from mobile devices, potentially in non-parametric form),
2. Metrics data (e.g. processed, filtered, polished, potentially parametric data),
3. Middle-layer data (e.g. aggregations and/or re-structured data), and
4. Insights data (e.g. high-level aggregations such as ready make behavioral or technical indicators).

Alternatively, e.g. layer 3 may not exist and related data may be included in layers 2 and 4 in some cases according to their nature, for instance. For example, in calculating a technical indicator for average time spent in 3G networks against all time spent in cellular networks, a technical indicator for a certain day may be directly calculated from metrics data, instead of doing any aggregations in between. Multi-layered, chained aggregations are used in cases where such an activity fulfills either or both of two conditions:

1. The aggregation process either simplifies the data or derives a particular kind of aggregated metric or structure of data, which better reflects the details or nature of an observed technical or behavioral event
2. The aggregation process leads into a situation where the outputted tables are significantly quicker to access or further process, through for example averaging A scalable means may be provided to access behavioral data and build customized views or statistics on top thereof. For the purpose, a feature called "middle-layer tables" for effectively storing at least partially aggregated data into a form that is easy to cultivate and/or process further through statistical or more descriptive methods and/or direct e.g. to other systems for further aggregations or visualizations. The data may be stored in SQL-based (Simple Query Language) tables (like MySQL), for instance, but may be preferably easily accessible through SPSS (Statistical Package for the Social Sciences) or other widely used statistical software tools, too. The data may be stored in at least one relational database, and the number of relations may increase as more data is analyzed (one shall remember that the data are collected in a non-parametric way).

Preferably the embodiments of the arrangement are not configured to take a fixed standpoint in the task of data processing or aggregations regarding what kind of statistics are needed in the final reports, whereupon there is the aforementioned feature called "further aggregations" which can effectively rely on the behavioral indicators calculated into middle layer tables, and generate practically almost any desired kind of statistics to internal or outsize purposes. Exemplary derived statistics could include:

1. Application stickiness, how many are using a particular application or application category daily out of those who use it on a weekly basis (i.e. shorter period (more frequent users) vs. longer period (less frequent users) type analysis).
2. Mobile web site relative attention figure, comparing the absolute amount of time spent on a certain domain versus all spent time with web browsing during a certain period of time
3. Ratio of good sleep vs. bad sleep (the ratio of nights less than 6 hours in length vs. all nights that have measured regarding a user).

Some embodiments of the present invention have been designed with an aim to minimize required storage capacity, protect consumers' rights, and/or facilitate speedy processing of data, whereby a feature called "periodic cleaning" may be applied. During the procedure, the arrangement may advantageously automatically periodically traverse through one or more stored raw and/or higher level data tables or other entities, and dispose the unneeded data points/entities from the storage all together.

Additionally or alternatively, data processing and storage can be flexibly distributed in the context of the embodiments of the present invention. For this, the aforementioned feature called "managing distributed data mining" may be utilized to effectively keep track regarding e.g. where a user is coming from, where his or her data points are stored, and if time stamps affect anyhow where the data processing and storage should take place. The storage of incoming data and its post-processing are advantageously following the centralized configurations of the system.

Figure 3:
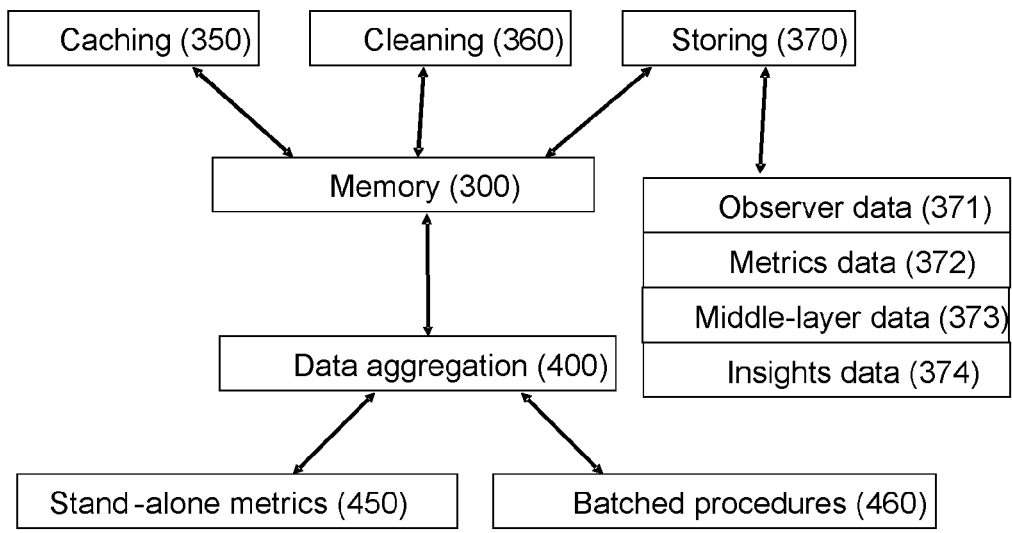
FIG. 3 is a combined block and flow diagram of one embodiment of the arrangement illustrating especially different aspects of layered data mining logic.

FIG. 3 depicts an embodiment of the layered data mining aspect of the present invention. First, caching 350 may be needed in ensuring that the memory can facilitate/serve all incoming requests, and that e.g. important conversion and transformations, if needed, are done for the incoming data in a coordinated fashion. A memory entity 300 may take care of core activities regarding data storage, managing the operational load and/or distribution of tasks, and centrally being in control of all data. The memory may apply the above-explained "cleaning" module 360 not only to remove outlier data points, but potentially also to improve the quality of final customer (e.g. the user of data API) data and to distribute information which is e.g. as meaningful, well-structured and/or as rich as possible. Finally, the cleaning module may be configured to remove older, already analyzed data. The storing functionality 370 may be configured to manage the layers of data, which may be defined to include, but not limited to, e.g. "observer data" 371, "metrics data" 372, "middle-layer" or "middle-level" data 373, and "insights data" 374" as briefly reviewed hereinearlier. The module 370 may actively virtualize the access to the constructed database of (mobile) observation information. Again, data aggregation 400 is configured to perform pre-defined actions to received data and, for example, ensure the processing of data in batches 460, or alternatively through more dynamic updates of e.g. key selected statistics 450.

As part of the layered data mining logic, one embodiment of the present invention is next described to illustrate the implementation and physical inputs and outputs of such a model.

One reason for layering the data storage and further, the aggregation procedures, may be due to a fact that such a model can convert practically any number of behavioral observations into a variety of aggregate indicators in an efficient manner. Particularly, as the related engine for calculating behavioral vectors may in these cases turn out quite complex, the amount of possible queries and statistical operations being potentially very high, the layered data mining model makes it possible to proactively pre-aggregate various tables, so that the final steps of behavioral vector calculus are as efficient to execute as possible, and their generation can be even real-time in most cases.

In applications where real human behavior is measured continuously, but the intended output of the arrangement is required to include a communication action to initiate, for example, a mobile advertising platform to send a message to the customer, the behavioral vector calculus module may not have a practical possibility of executing a calculus operation that would take too much time, or cover too many queries, and therefore it should be able to leverage already aggregated tables in calculating a high-level average figure for the past behavior, and a simple measure to reflect if that average behavior is different from the current behavior.

As an example, it is herein described how locations may be prepared through a layered data mining model. In the first level data, each location update is time-stamped and the amount of information is potentially very high. In the next step, after first-level data processing, there is an output file where an approximate, smoothed location is written for each 5-minute period, using heuristics and other procedure, like support engines as specified in this invention. Additionally, data is enriched, so for example place names (building, street, city, country) are added to the rows to make a bit more semantic description of the data.

In the next step, in the layered location data handling, there is a process that can be started at any particular time, for example every night, which takes as an input a specific range of location data, for example a time period between a specific starting and ending date. This is a so-called batch process, which periodically, rather than real-time, processes data.

In practical applications, this process may be designed to run in desired optimal periods, for example every 24 hours, and it can every day process for example the past 3 days of data. In the light of consequent days, overlapping aggregations may be thus (purposefully) determined. If new data is received from a certain user only on one day, but not the day before, covering his/her past 3 days of behavior, it is important that the batch process of said one day is able to fill in the missing gaps and update key aggregations for this user also for the past days, not only for said one day. The architecture may be designed so that if there are overlapping data, the new aggregations may override the old ones.

In the aggregation engine, the periodic process will complete a number of items, in sequence:

1. It will calculate an aggregated entity such as a table where for each user, for each date, and for each hour, there will be for each entity of aggregations, for example city, a row calculated, indicating how many 5-minute periods, or any other time-related units, the user had spent in that location.

2. It will also calculate a similar entity/table, using the output aggregations of step 1, to end up with a table where for each user, for each date, a similar location breakdown will be presented.

3. Finally, over the next steps, there can be an aggregation procedure that will calculate such information for a very long time, for example one year, reflecting the user's higher level location patterns precisely. Higher level location patterns might be more interesting, in for example studying where the user lives, as the randomness and variance of daily life is not restricting the analysis, this meaning the fact that in low level data tables there is lots of noise, for example thousands of places temporarily visited and also potentially exceptional deviations from normal life patterns taking place like holidays, and by aggregating statistics to a longer period of time and by also filtering non-significant places, it is easier to pinpoint the significant places and the likelihood for temporal deviations in the user's life is much lower to have any impact.

In the design of this kind of multi-layer data models, the output of steps described above are used to form so-called aggregation, derived or middle-layer tables, which make further calculations easier. For example, based on the outputs of item 1, it is relatively straightforward to calculate for each week, for each location entity, the most typical (median) hour, which makes it possible to heuristically take a standpoint, for example, regarding if that is an office location or home location.

Further, these kinds of aggregate outputs, for example the output (table) of item 2, may be used in deriving a further aggregation at any time, which describes for each weekday, the ranking list of locations, making it possible to understand weekly patterns in terms of activity and locus of movements and time spending.

In the light of middle-layer tables, there are all kinds of types for behavioral calculus and/or processing which represents as the highest layer in data processing, including averaging, summing, estimation of variance, derivation of correlation coefficients, measuring entropy and so on. For example procedures where average usage activities like spent face time with web browser, maximum monthly usage frequencies for sending multimedia messages, average variance of the user's location dynamics in terms of kilometers commuted during a day, and an aggregate indicator for the share of time spent in poor signal strength conditions, are all outputting variables that are typically calculated for a certain time period, and can be directly used in relevant reporting or analysis practices, perhaps by doing just one level of averaging or combination, but the data itself being on the highest level in terms of information content Based on aggregated tables, with simple queries and procedures meaningful statistics may be calculated, like average time spent at home for a particular week. From raw-level data this would be practically impossible to convert quickly, because the data needs to be first aggregated, time stamps calculated, home locations identified, etc. prior to deriving the actual high-level metrics or indicators. The aggregate tables and the dynamical load balancing and responsibility division enables for different entities of the aggregation and data mining functionality of the present invention to proceed independently from each other, and the outputs of one process, for example estimated face times for web browser usage for a certain day, may be direct inputs of the other process, for example a process of deriving a metric for the variance in the usage times of the web browser across multiple days. Through a batch processing approach, where the processed incoming data is e.g. periodically sent through a process during which more meaningful indicators and metrics are derived, the most recent data is practically in a minimum possible time, for example after each day that day's key statistics are calculated, available in an optimal form, facilitating complex calculations if needed. In other words, the design is capable of separating aggregation work from statistics and behavioral vector calculations, to make it more efficient for the system to handle big amounts of data, though still being rapid regarding the assumed key requirements of applications like mobile advertising or automatic user profiling solutions.

In a similar fashion, multi-layered aggregation and calculation engines can be designed for the processing of application usage logs, web browser click streams, music consumption, sleeping data, and even audio and video signal observations, for instance.

As mentioned above, the storing functionality 370 may be configured to manage different data layers:

1. "observer data" (371), including e.g. raw-level transactions (application usage, voice calls, messages) and scans (WiFi scans, Bluetooth scans, memory file system scans etc.) in a basic form,
2. "metrics data" (372), including e.g. polished (processed/cultivated) data (outliers excluded, meta-data added, data streams converted into parametric form),
3. "middle-layer" data (373), including e.g. (lower level) aggregations and re-organized, more structure data with sometimes supporting metrics being enriched and attached, and the key information points being prepared for the calculus of final metrics, 4. "insights data" (374), including e.g. key statistics and final aggregation results.

Advantageously, the present invention serves potentially e.g. hundreds of customers willing to retrieve data from the provided arrangement at any particular time to access it, for example, by making a query for the calculated data points and statistics. The aforesaid feature called "virtual access" may be configured to construct an abstraction of the user's behavioral indicators and virtualize middle-layer tables so that they are easier to access. The "virtual access" feature may connect one or multiple network servers together to provide e.g. a homogenous user experience for customers who are using the provided API actively. The virtualized access may provide that the customer does not need to know how many servers collected the date, where the servers are physically located, etc., as the arrangement described may provide a homogenized view for entering technical queries into the system.

Various embodiments of the present invention may be advantageously built with support for a semantic data model, whereupon the provided arrangement may be enabled to describe concepts like (user) sleeping or movements separately, attaching important data points like location and time periods to them periodically, and forgetting e.g. the raw observation data collected. A related "conversion feature", implemented e.g. in connection with processing entity/module 210, may be configured to add semantic information to the data points, and enable more natural language oriented semantic requests. Among others, these semantic data points could include any one or more of the following:
  1. Location names (NYC, Beijing) and descriptors (Chinese restaurant, golf course),
  2. Music types (e.g. MP3, WAV) listened and/or genre (e.g. heavy rock, blues, dance, classical),
  3. Information on significant locations, like "Home" and "Office".

Preferably the implementation of the present invention ensures that the required filtering and exclusion tasks can be done for the analyzed and/or processed data. As large amounts of information may be requested from the provided arrangement by external parties, i.e. customers, it is desirable that there are a set/number of filtering and exclusion tasks that are able to check for predetermined, specific things in the data, and either drop or manipulate associated data points so that the output is as preferred, such as a more structured and meaningful. For example, it might be needed that certain statistics should be derived only for certain sets of users or for a certain period of time only.

Figure 4:
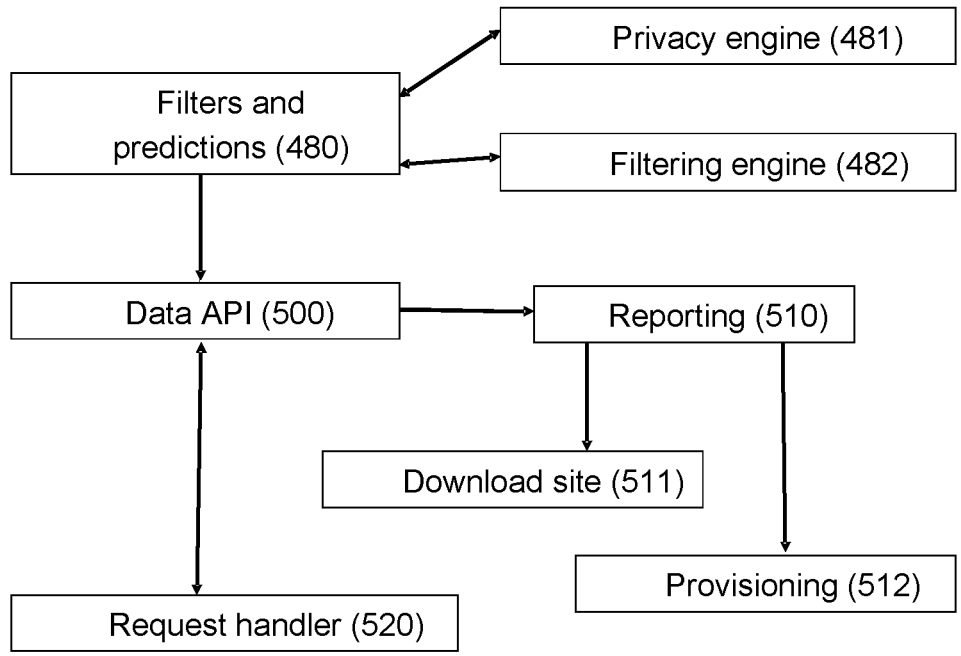
FIG. 4 is a combined block and flow diagram of one embodiment of a data output interface, such as contextual/behavioural application programming interface, applicable in the suggested arrangement.

FIG. 4 depicts an embodiment of a data output interface 500, e.g. application programming interface (API), and the related data distribution logic. In the process, the ready-made data for outputs, including for example the key statistics, indicators, and sometimes even middle-layer metrics, may be first filtered, and optionally communications with the prediction engine 487 to be described hereinafter may be handled by the filters and data prediction module 480. Data API 500 may be configured to manage predetermined operations relative to API usage, whereas a privacy engine 481 may dynamically provide guidelines and/or settings regarding what kind of data or statistics may be stored for any particular user or user group, for instance. Similarly, a filtering engine 482 may include specifically the rules for filtering outgoing cases, for example removing certain kinds of data points because of the low statistical significance of them, or restricting outputs to a certain set of people because of for example access or privacy related reasons, and/or for harmonizing the data outputs— even for customer-specific purposes. The request handler module 520 may communicate with the customers/users of the arrangement, being either machines (through defined API commands) or humans (through ad-hoc API requests), and its main purpose advantageously is to interpret what data points need to be passed forward. The reporting module 510 may be responsible for generating either automatically or alternatively on request, reports or data tables that contain a defined set of data points in the defined data structures. The reports may be stored either into a customer-specific download site 511 or other entity, or alternatively be communicated further by the provisioning module 512 that can send output data such as tables and reports forward even through e-mail or some other supported media.

Figure 5:
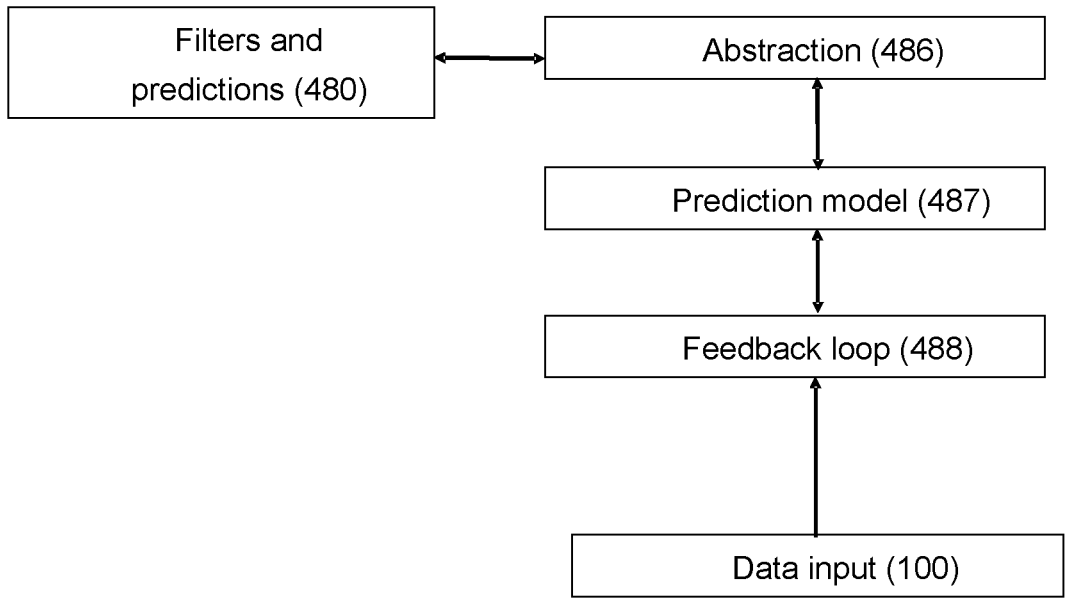
FIG. 5 is a combined block and flow diagram of one embodiment of a data prediction module, or prediction engine, applicable in connection with the provided arrangement.

FIG. 5 depicts an embodiment of a prediction engine in accordance with the present invention. Advantageously the prediction engine is configured to integrate the handling of real-time behavioral vectors in the arrangement through an integration module 480. Abstractions, like clusters of behavioral vectors inside a certain time-frame, may be formed in an associated module 486 before other actions are substantially performed regarding predictions. The prediction model 487 may include a multi-dimensional and complex module, which comprises a number of state machines for different kinds of behavioral abstractions. The feedback loop 488 may bring in real-time data for performance evaluation purposes, and continuously maintain, for example, indicators that reflect the success likelihood of any particular prediction. Finally, the afore-explained data input module 100 may interface observation data streams and relevant external modules like, for example, ad networks.

With the "abstractions" module that combines a multi-dimensional vectors out of available behavioral vectors (e.g. hour-level location dynamics) it is possible to generate vectors that can be characterized as behavioral traces, naturally experiencing sometimes lots of variance from unit of time to another, but nevertheless describing a certain behavioral pattern as already deliberated hereinearlier. After abstractions, a user's life may be easier to analyze through tools of machine learning and/or pattern recognition. An exemplary descriptor vector regarding a user could be: Woke up in place X, Moved from X to Y, Met H, Moved from Y to Z.

In order to predict what people are likely to do next, a model of user behavior 487, i.e. prediction model, may be dynamically built, which includes abstractions of behavior as elements with, for example, Markov chain kind of dynamics between elements. As a further feature, the prediction model may be configured to dynamically calculate model weights and/or likelihoods of different shifts in the underlying system (arrangement), and practically at any time provide a vector with likelihoods for possible next states of the system (arrangement).

Continuous learning process may be applied to new arriving data. The feedback loop 488 may be configured to update the prediction model 487, and calculate e.g. a (continuous) metric depicting how successfully the model's predictions are at any given time, for instance. Through certain thresholds, the performance of the prediction engine can be addressed in real-time. The feedback loop may enable the prediction engine to be truly self-learning.

Predictions may be provided dynamically, for example for the purposes of mobile advertising (context-tied, predictive and targeted advertising) or network performance analysis and optional optimization. For the former purpose, the associated state machine (e.g. a Markov model) may be configured to (continuously) provide predictions for the next state (e.g. the next location, name of the next person the user calls, the music artist he is going to listen next), and through the calculated performance indicators (how likely the model is to be right) and external or internal modules that provide the pool of specified ads, the system might trigger specific actions, like a pop-up of a certain ad, if the conditions are prospective enough according to the used criteria.

Reverting to the prediction model 487, it may be utilized for obtaining educated guesses regarding people's likely comings and goings in the short-term, like during the next minutes, or in longer term future, meaning during the next week, for example. The prediction model 487 may be configured to maintain a relatively large network of states for (mobile) users. The states can be multi-dimensional. For example, (home, sleeping) and (home, in a meeting) could represent two two-dimensional states, across e.g. location and social states that the behavioral data mining engine is outputting.

The prediction engine may be structured so as to be able to (easily) update the associated model, re-weight edges (arrows), and/or input data in a standardized way without heavy data processing activities. As an example, the prediction engine may be enabled to input behavioral and or technical data in multiple dimensions, like location, movement, meeting status, battery status, application usage, web browsing clickstreams, and proximity status, where for each dimension categorical or scale variables are used to differentiate between possible states. The prediction model may be then used for creating a multi-layered relational database model, which is optimized for network oriented data storing and network modeling. Out of this storage, the prediction engine may then refreshing so-called prediction model(s) 487. Prediction models 487 can be, for example, very specific to location patterns, or they can be more complex and multi-dimensional, including things like location and social activity in the same model through multi-dimensional states. However, this does not change the basic idea in the prediction model 487, where the model is depicted typically as a Markov state machine, or any other relevant model which supports multi-dimensional network structures with potentially 2-way vectors describing the relationships.

In the prediction model 487, the links between nodes, which describe different states, are weighted into both directions; they describe the likelihoods for mobile users to move between them, given that a movement from the current state will take place. The prediction model 487 is not static, so new data may be inputted all the time, and each observation contributing to the weight of a given link is also stamped with attributes like time, weekday, social context, battery status and so on. This makes it possible for the arrangement to do two things:

1. First of all, to give quick high-level recommendations regarding if a certain thing is like to take place next versus some other things, and through trial and error, as there is a feedback loop to the system, it may be learned about the key threshold(s), when it is more likely that the priority one guess is right or not. This model is generically being able to tell about people's likely patterns for the next hours, being able to calculate high level probabilities for the person for example to leave point A, visit point B, and end to point C or D during the next hours. The same can be used in predicting that for example after having a call with wife, is the user more likely to start moving or perhaps to start a meeting. This approach is more about static, more about profiling the user's context.

2. The other possibility is that the predictions are more dynamic, more about predicting short-term events. The implementation of the system, as described above, is of such kind, that if the system knows the user's current context (the current state), and its knows various other (important) variables like current location, time and weekday, it can use more sophisticated statistical modeling to get a quick estimate that what would be for example the likelihood, given current situation, to start moving during the next 5 minutes, or what could be the likelihood to turn the mobile device off. These more dynamic, intelligent predictions, are possible as the population of historical data behind a certain observation presenting an observed reflection of the link is multi-dimensional and parametric, and therefore makes it possible to give more precise answers to concrete questions, given enough contextual data is available.

In one embodiment of the invention regarding prediction modeling, the arrangement may be capable of calculating for each link or groups of links, vectors of links, measures like predictability, which then reflect not only the user's behavioral profile, in other words are his/her movement patterns very wild and unpredictable, but also serve as input for serving requests and deciding if a certain request can be reliably answered or not.

In the prediction engine, there overall arrangement is closely tied to the data base structures, and multi-dimensional data mining with behavioral data. The prediction model is one outcome of the model, but it is tied to the real world through applications like mobile advertising or real-time content optimization on mobile web sites or other content providers. Other applications could include for example adaptive services that are capable of proactively alarming you regarding, for example, traffic jams.

In the weighting and probabilistic modeling of the state machine, standard network models and Markov model based machine learning approaches can be used, with either 1-, 2- or further degree Markov models. Time series data, and more than the current or previous state, can be used as input for any given prediction. In predicting more concrete single events, the arrangement may use any known methods, even linear and non-linear regression methods, to fit the existing data, estimate the model, and to give a suggestion regarding what could be the likely outcomes, or for example, the estimated time to a certain event given the current and past behavior and or technical status.

In the prediction engine, one aspect is the utilization of multiple different layers of data to make best guesses regarding people's likely future behavior, for example the likelihood of changing from place A to B during the next 60 minutes, and the possibility to tie historical data and associated models with more real-time data coming from mobiles, and establishing a direct and real-time feedback loop with the real world events. The key lies in the multi-dimensional state machines, where each link, or behavioral jump, has enough background observations that facilitate more sophisticated predictions. At the same time, the model itself, as a more statistic entity, can give concrete outputs regarding people's behavioral patterns or it can be used to send a very targeted campaign message that is based on a segmentation model. The prediction model is reflecting the past behavior, and giving likelihoods regarding what the future could look like given that past behavior.

Figure 6:
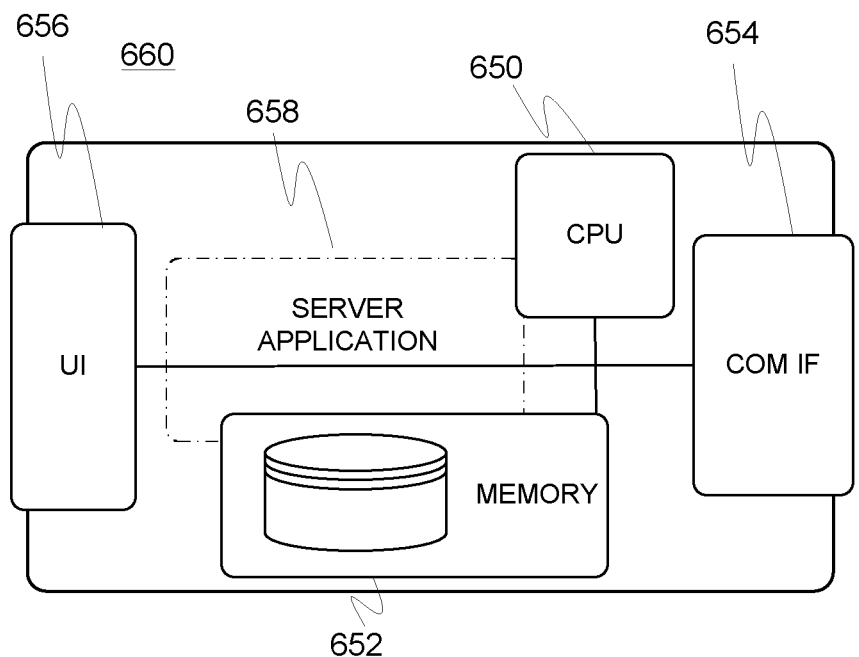
FIG. 6 is a block diagram of an embodiment of a server arrangement entity in accordance with the present invention.

FIG. 6 illustrates various technical aspects of the present invention and related arrangement in the light of a certain feasible embodiment. The server arrangement 660 may be provided with one or more processing devices capable of processing instructions and other data, such as one or more microprocessors, micro-controllers, DSP's (digital signal processor), programmable logic chips, etc. The processing entity 650 may thus, as a functional entity, physically comprise a plurality of mutually co-operating processors and/or a number of sub-processors connected to a central processing unit, for instance. The processing entity 650 is configured to execute the code stored in a memory 652. Software 658 for implementing the observation data collecting, processing and analysis system of the present invention may utilize a dedicated or a shared processor 650 for executing the tasks thereof. Software functionalities 658 may be implemented as one or several, mutually communicating, software applications and/or modules. Similarly, the memory entity 652 may be divided between one or more physical memory chips or other memory elements. The memory 652 may further refer to and include other storage media such as a preferably detachable memory card, a floppy disc, a CD-ROM, or a fixed storage medium such as a hard drive. The memory 652 may be non-volatile, e.g. ROM (Read Only Memory), and/or volatile, e.g. RAM (Random Access Memory), by nature.

The UI (user interface) 656 may comprise a display, and/or a connector to an external display or data projector, and keyboard/keypad or other applicable control input means (e.g. touch screen or voice control input, or separate keys/buttons/knobs/switches) configured to provide the operator thereof with practicable data visualization and device control means. The UI 656 may include one or more loudspeakers and associated circuitry such as D/A (digital-to-analogue) converter(s) for sound output, and a microphone with A/D converter for sound input. In addition, the entity 660 comprises a communications interface such as a wireless and/or wired interface for general communications with other entities and/or a network infrastructure, such as one or more radio transceivers (e.g. WLAN) or wired transceivers/interfaces (e.g. Firewire, USB (Universal Serial Bus), a LAN (Local Area Network) adapter such as Ethernet adapter, etc.)

The software (product) 658 may be provided on a carrier medium such as a memory card, a memory stick, an optical disc (e.g. CD-ROM or DVD), or some other memory carrier. The instructions required for implementing the application(s) may be stored in the carrier medium as executable or in some other, e.g. compressed, format, such that the software may be transported via the carrier medium to a target device and installed therein, e.g. in the hard disk thereof, or executed directly from the carrier medium in the target device by loading the related instructions to the memory of the target device not until execution, for instance. Alternatively, software may be transmitted to a target device over the air via a wireless transceiver or a through a wired communications connection.

Figure 7:
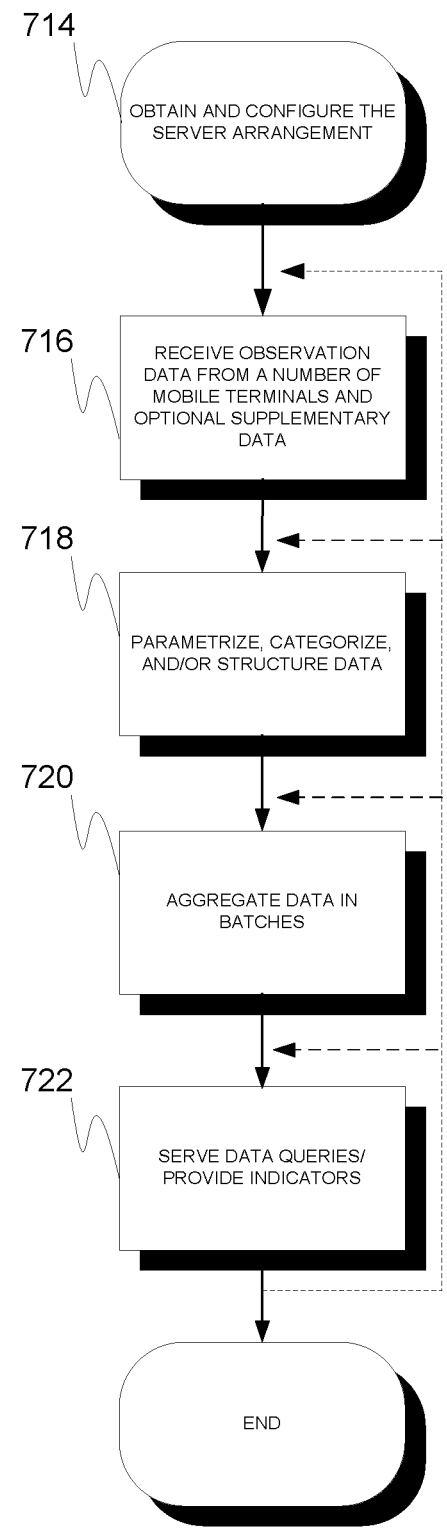
FIG. 7 is a flow diagram disclosing an embodiment of a method according to the present invention.

FIG. 7 discloses a simplified flow diagram of a merely exemplary embodiment of a method in accordance with the present invention.

At 714 a server arrangement in accordance with an embodiment of the present invention is obtained and configured, for example via installation and execution of related software, for managing observation data originating from mobile devices or other data sources. At 716, observation (raw) data is received and stored. Optionally also supplementary data from a number of external data sources (e.g. metadata providing location information) may be received. At 718 the received data is parametrized, categorized, structured, etc., potentially in chunks or batches, i.e. processed further. At 720 various aggregations, abstractions, and/or predictions may be derived on the basis of the parametrized data. Different behavioral and/or technical indicators describing the data may be established, for instance. Prediction tasks may be performed. Alerts and/or triggers as explained hereinbefore may be activated. Advantageously the data is stored using several (abstraction) layers for facilitated, more rapid future processing. At 722 an external data query is served by provision of queried indicators and/or other higher level information in return. Alternatively, higher level information may be pushed to one or more external parties based on a predetermined schedule or e.g. data service subscriptions. The broken loop-back arrow depicts the potential repeatability of different method items in accordance with the teachings set forth hereinbefore. New raw data may be received and higher-level entities such as aggregations be updated.

A skilled person realizes that the illustrated flow diagram is indeed merely exemplary and the nature and number of method steps, not forgetting the mutual order thereof, may be dynamically and/or use case—specifically adjusted.

The scope of the invention can be found in the following claims. Notwithstanding the various embodiments described hereinbefore in detail, a person skilled in the art will understand that different modifications may be introduced to the explicitly disclosed solutions without diverging from the fulcrum of the present invention as set forth in this text and defined by the independent claims.

The invention claimed is:

1. A system, comprising:
a data input to receive multi-dimensional, non-parametric data obtained from mobile devices;
a processor to parametrize the multi-dimensional, non-parametric data into a plurality of different abstraction layers as multi-layered data;
a memory to store the parametrized data;
an aggregation apparatus configured to aggregate the parametrized data in batches using at least one of time-series, averaging, or sum operations, the aggregation is performed relative to at least one of (1) a time period, (2) a location, (3) a mobile application, (4) a mobile application category, (5) a mobile user, or (6) a mobile user group, the aggregation apparatus is to determine, from at least one of the data batches, at least one of:
descriptive higher-level behavioral indicators for the mobile devices, or
descriptive higher-level technical indicators for the mobile devices,
the aggregation apparatus is configured to be activated based on at least one of a sufficient amount of data becoming available or a trigger; and
a data export entity to provide at least one of the behavioral indicators or the technical indicators to an external entity for determining at least one of personalized content or a network performance optimization for at least one of the mobile devices.

2. The system of claim 1, further including a prediction entity to host a prediction model, the prediction model to provide a likelihood of at least one of (1) a future state, (2) a future pattern, or (3) a future location for at least one of the mobile devices based on previously obtained data.

3. The system of claim 2, wherein the prediction model includes a Markov state machine.

4. The system of claim 2, further including a feedback entity to provide information to the prediction entity on whether a prediction was successful or not to enable adaptation of the prediction model.

5. The system of claim 1, wherein the aggregation apparatus is configured to determine a number of multi-dimensional behavioral vectors for behavioral indicator values, the multi-dimensional behavioral vectors including a vector indicative of at least one of traveling activity, movement activity, music consumption activity, or sleeping activity.

6. The system of claim 5, wherein the aggregation apparatus is configured to aggregate at least one of previously determined behavioral indicators or vectors to construct further statistics.

7. The system of claim 5, wherein the aggregation apparatus is configured to process behavioral indicators to determine at least one of:
dynamic behavior of a mobile device, or
differences between at least two mobile devices using at least one of Pearson correlation coefficient or regression analysis, the aggregation apparatus to use at least two behavioral vectors of behavioral indicator values to generate a behavioral similarity index or time trend data including an average slope thereof.

8. The system of claim 5, wherein the aggregation apparatus is configured to trigger an alarm on a basis of a triggering condition relative to a comparison result between two behavioral vectors of behavioral indicator values or relative to a calculation of a new behavioral indicator.

9. The system of claim 5, wherein the aggregation apparatus is configured to abstract behavioral indicators by determining a number of multi-dimensional behavioral vectors on a basis of already available behavioral vectors of behavioral indicator values to describe a behavioral pattern.

10. The system of claim 5, wherein the aggregation apparatus is configured to determine a substantially continuous behavioral vector by automatically augmenting one or more missing portions using one or more of preceding data or following data.

11. The system of claim 1, wherein the processor is to parametrize the multi-dimensional, non-parametric data according to one or more of (1) categorization, (2) structuring, or (3) structuring based on content, the processor is to add one or more of location tags, web domain data, or mobile application data, the processor to determine an application or mobile content entity identification.

12. The system of claim 11, wherein the processor is to categorize using at least one of: application usage data, web browsing usage data, network performance data, access network scan data, cellular network scan data, WiFi scan data, memory usage data, device feature usage data, device system data, alarm clock data, calendar data, media usage data, content usage data, phone book content, message logs, voice call logs, or positioning data.

13. The system of claim 1, further including a support engine entity to add one or more of remotely received parameters or locally generated parameters to the received non-parametric data, the one or more of the remotely received parameters or the locally generated parameters including one or more location stamps.

14. The system of claim 1, wherein the aggregation apparatus is configured to process a behavioral and statistic indicator to determine at least one of: average browsing time in predetermined time units, average sleeping time during a predetermined period, average span of daily movements, average entropy of location dynamics for a predetermined period, application usage activity, or application usage frequency.

15. The system of claim 1, wherein the aggregation apparatus includes a semantic model entity to associate semantic data including at least one of movement, location names, nature of locations, application consumed, or data type consumed with received non-parametric data for enabling natural language oriented semantic data queries.

16. A processor-based method, comprising:
accessing, with a processor, multi-dimensional, non-parametric data obtained from mobile devices;
parameterizing, with the processor, the multi-dimensional, non-parametric data into a plurality of different abstraction layers as multi-layered data;
storing the parametrized data in a memory;
aggregating, with the processor, the parametrized data in batches using at least one of time-series, averaging or sum operations, the aggregation is preformed relative to at least one of (1) a time period, (2) a location, (3) a mobile application, (4) a mobile application category, (5) a mobile user, or (6) a mobile user group, the aggregating of the parameterized data to determine at least one of:
descriptive higher-level behavioral indicators for the mobile devices, or descriptive higher-level technical indicators for the mobile devices,
wherein the aggregating of the parameterized data to determine to be activated based on at least one of a sufficient amount of data becoming available or a trigger; and
providing at least one of the behavioral indicators or technical indicators to an external entity for determining at least one of personalized content or a network performance optimization for at least one of the mobile devices.

17. The processor-based method of claim 16, further including determining a number of multi-dimensional behavioral vectors for behavioral indicator values the multi-dimensional behavioral vector including a vector indicative of at least one of traveling activity, movement activity, music consumption activity, or sleeping activity.

18. The processor-based method of claim 17, further including aggregating previously determined behavioral indicators or vectors to construct further statistics.

19. The processor-based method of claim 17, further including processing behavioral indicators to determine at least one of:
dynamic behavior of at least one of the mobile devices, or
differences between at least two mobile devices; and
using at least one of Pearson correlation coefficient or regression analysis, using at least two behavioral vectors of behavioral indicator values to generate a behavioral similarity index or time trend data including an average slope thereof.

20. The processor-based method of claim 17, further including triggering an alarm on the basis of a triggering condition relative to a comparison result between two behavioral vectors of behavioral indicator values or relative to a calculation of a new behavioral indicator.

* * * * *

UNITED STATES PATENT AND TRADEMARK OFFICE
CERTIFICATE OF CORRECTION

| | | |
|---|---|---|
| PATENT NO. | : 9,148,458 B2 | Page 1 of 1 |
| APPLICATION NO. | : 13/806820 | |
| DATED | : September 29, 2015 | |
| INVENTOR(S) | : Verkasalo | |

It is certified that error appears in the above-identified patent and that said Letters Patent is hereby corrected as shown below:

In the claims:

Column 32, line 13 Claim 16 replace "preformed" between "is" and "relative" with "performed".

Signed and Sealed this
Second Day of August, 2016

Michelle K. Lee
*Director of the United States Patent and Trademark Office*